June 8, 1948.　　　　G. E. McVEY　　　　2,443,049
FORCE MEASURING INSTRUMENTALITY
Filed March 22, 1945　　　　　　　　　　　2 Sheets—Sheet 1

Inventor
Gerald E. McVey
By W. S. McDowell
Attorney

June 8, 1948.　　　　　G. E. McVEY　　　　　2,443,049
FORCE MEASURING INSTRUMENTALITY
Filed March 22, 1945　　　　　　　　　　　　　　2 Sheets-Sheet 2

Inventor
Gerald E. McVey
By N. S. McDowell
Attorney

Patented June 8, 1948

2,443,049

UNITED STATES PATENT OFFICE 2,443,049

FORCE-MEASURING INSTRUMENTALITY

Gerald E. McVey, Columbus, Ohio

Application March 22, 1945, Serial No. 584,120

1 Claim. (Cl. 73—1)

This invention relates to force measurement, and has for an object thereof to provide a simple yet efficient instrumentality for indicating the torque applied to a rotatable element in effecting its rotation under various load conditions.

In its more specific aspects, my invention is concerned with an improved instrumentality for testing torque wrenches of the character provided with slip or break-joint handles. As is well understood, such wrenches are constructed so that when a predetermined degree of torque effort is applied thereto, as in the tightening of engine cylinder head nuts, the spring or friction-actuated joints, used in uniting the nut-engaging jaws of such wrenches with associated handles, will break or open, thereby indicating that the nuts, or other threaded bodies, have been tightened to the limits afforded through the use of such wrenches. It frequently happens, however, that such wrenches, through wear, improper adjustment, or other causes, will not break or open at exactly the pressures or force applications to which they are supposed to respond.

It is, therefore, one of the more specific objects of the present invention to provide an improved testing instrumentality, through the use of which wrenches of the type indicated may be individually tested in an expeditiously and convenient manner to determine their breaking or opening response to ascertainable forces or pressures, whereby each wrench may be adjusted or calibrated to operate uniformly and impart equivalent results when used.

It is another object of the invention to provide a torque-measuring instrumentality having a rotatably mounted force-receiving element with which is rigidly formed or united an oscillatory lever, there being associated with said lever an independently mounted and adjustable fluid-displacing means and a cooperative fluid-pressure actuated gage, the relationship of these parts being such that when the lever is oscillated by force applied to the rotatable element, fluid under pressure is transmitted to the gage, causing the operation of the latter to denote visually the magnitude of the applied force.

Still, a further object of the invention is to provide a torque-measuring instrumentality of the character set forth wherein the fluid-displacing means is adjustable relative to the oscillatory lever in order to adapt said instrumentality to various testing conditions in which high or low pressure gage readings are desirable.

For a further understanding of the invention, and additional objects and advantages thereof, reference is to be had to the following description and the accompanying drawings, wherein.

Figure 1:
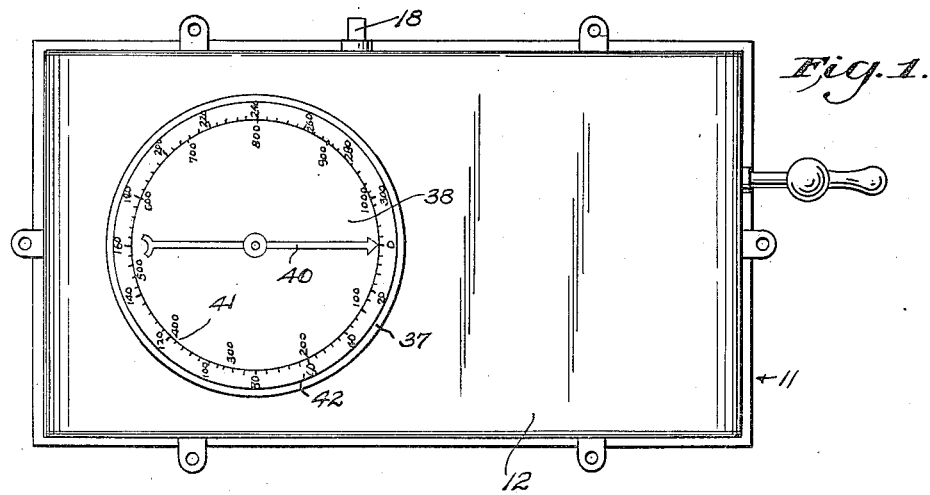
Fig. 1 is a top plan view of a torque-testing instrument formed in accordance with the present invention.

My improved torque-testing instrument, in the specific embodiment thereof set forth in the drawings, comprises a casing having a bottom 10 and a superposed cover 11, the latter including a sloping top wall 12 and depending vertical sides 13 which are suitably joined at their lower edges with the bottom 10. Mounted within the casing and resting on the upper surfaces of the bottom 10 is a metallic base plate 14.

Formed with or secured to the base plate is a pair of spaced upstanding supports 15, which carry at their upper ends a pair of bearing brackets 16. Supported in these brackets and extending transversely of the instrument is a power-receiving rotatable element or shaft 17, one end of the latter being extended through an opening provided in one of the sides 13 of the casing, the exteriorly projecting end of the shaft being provided with polygonal wrench-receiving surfaces 18, by means of which a torque wrench, not shown, to be tested, or other equivalent means, may be associated with the shaft to cause its partial rotation by an extraneously applied force.

Pinned as at 20 to the shaft 17 for oscillation therewith, and arranged between the brackets 16, is an oscillatory lever 21. In the preferred adaptation of the present invention, the lever projects equidistantly from opposite sides of the rotatable element or shaft 17, although it will be understood, particularly as the present description proceeds that, in a more simplified form of the invention, the arm may project from but one side of said element or shaft. Cooperative with the flat under surface of the lever is one or more fluid-displacing units 22 and, in this instance, two of such units, arranged on opposite sides of the shaft 17, having been shown.

Figure 4:
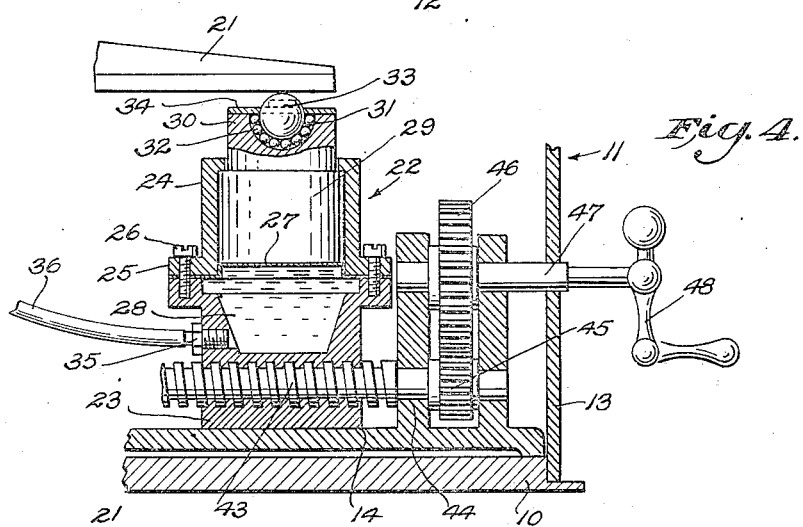
Fig. 4 is a fragmentary vertical sectional view on a somewhat enlarged scale disclosing the fluid-displacing means and the adjusting mechanism therefor.
Figure 5:
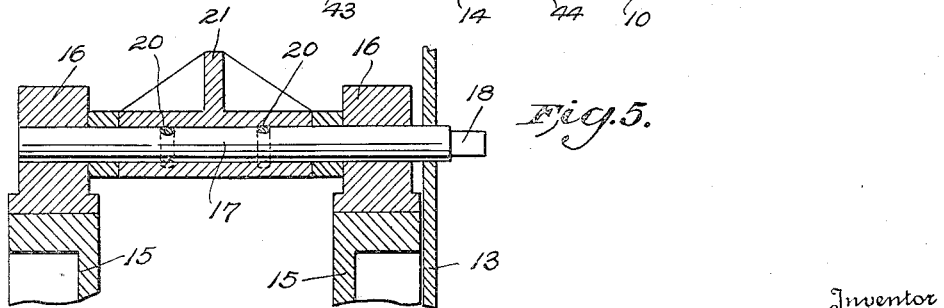
Fig. 5 is a vertical transverse sectional view, disclosing the rotatable force-receiving element of the instrument and the associated lever mounted thereon.
Figure 2:
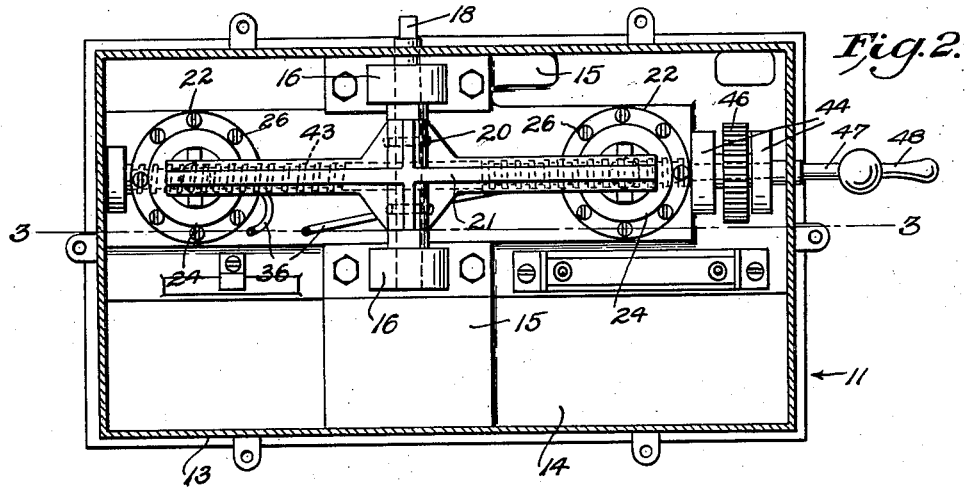
Fig. 2 is a horizontal sectional view taken through the casing of the instrument.
Figure 3:
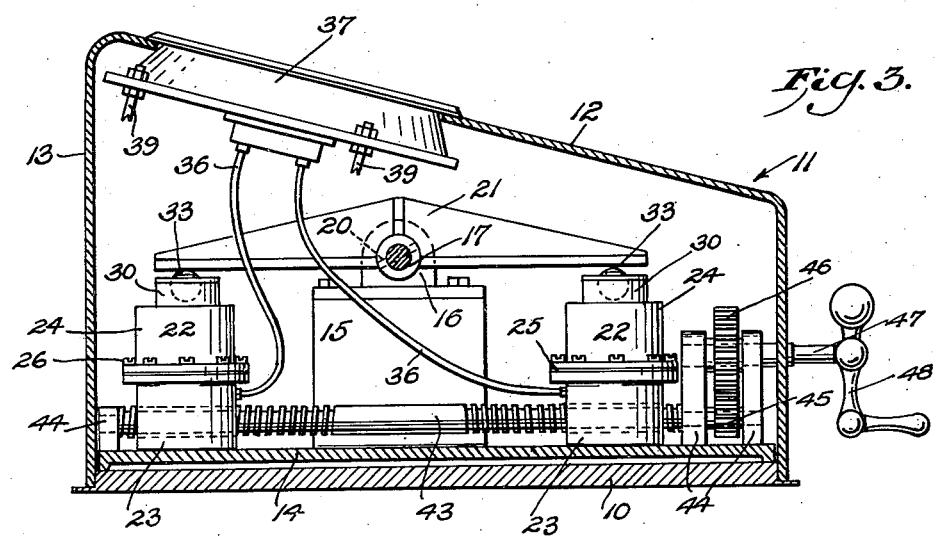
Fig. 3 is a vertical sectional view, the plane of which being disclosed by the line 3—3 of Fig. 2.

Each of these units, as disclosed in Fig. 4, comprises a housing composed of a metallic base member 23 and a top member 24, these members having their adjoining ends flanged, as at 25, and united in adjoining order by means of screws 26. Clamped between the flanges 25 is a substantially horizontally disposed diaphragm 27. Below this diaphragm, the base member 23 is formed with a well 28 for the reception of a liquid, while above the diaphragm the top member 24 is provided with a reciprocatory piston 29. The latter includes an upwardly directed extension 30 which projects through an opening in the upper end of the member 24, the lower end of the extension terminating in an annular shoulder which engages a flange and the upper end of the top member 24 to limit upward movement of the piston 29. The extension, at its upper end, is formed with a semispherical socket 31, adapted for the reception of a plurality of ball bearings 32, and upon these bearings there is seated a larger single ball element 33 which is retained in its operating position by means of a disk 34 attached to the upper end of the piston 29. The ball element 33 is adapted to be disposed in engagement with the under surface of the lever 21, so that when the latter is oscillated by rotating forces applied to the shaft or element 17, the piston 29 will be forced downwardly, moving the diaphragm 27 therewith and displacing the fluid contained in the well 28.

The well 28 of each of the fluid displacing units, is provided with an outlet fitting 35, with which is connected a length of flexible tubing 36. Such tubing extends to the pressure-receiving side of a pressure-indicating gage 37, the latter being mounted in the sloping top 12 of the casing, with its dial face 38 exposed to the view of the instrument operator, the gage being supported in connection with the threaded upper ends of supporting rods 39, arising from the base plate 14.

The gage 37 is of standard construction, having a rotatable indicating hand 40 which is rotatable over high and low pressure calibrated scales 41 and 42, respectively, provided on the dial face 38.

In order to adapt the instrument conveniently to indicate torque forces of relatively high and low degrees, the fluid displacing units are mounted on the base plate 14 for longitudinal adjustment toward and away from the center of oscillation of the lever 21. Conveniently, this may be accomplished by providing the base members 23 of said units with horizontally disposed threaded bores for the reception of a threaded shaft 43, the ends of the latter being rotatably supported in vertical bearing extensions 44 arising from the base plate 14. Threads on one end of the shaft 43 are of the right hand type, while those on the other are of the left hand, so that when the shaft is rotated in one direction, the fluid-displacing units will be caused to approach toward or recede from each other. To rotate the shaft 43, the latter is provided at one end with a pinion 45 which meshes with a gear 46. This gear is fixed on a rotatable exteriorly projecting shaft 47, the latter having its outer end equipped with a manipulating crank handle 48.

In the use of the instrument, when torque wrenches of low breaking point are to be tested, the fluid displacing units, through the rotation of the threaded shaft 43, are moved as closely as possible toward the axis of oscillation of the lever 21. A torque wrench, or the like, may then be applied to the outer end 18 of the rotatable element or shaft 17. It will be seen that by applying a torque wrench to said element, the latter may be rotated in either direction when the dual fluid-dispensing units are employed. The resulting oscillation of the lever depresses the piston of one of said units, transmitting fluid under pressure to the gage 37, which indicates on the low pressure scale 42 thereof the degree of torque effort applied to the shaft 17 at the time the handle of the torque wrench slips or breaks to an open position. When torque wrenches of higher breaking point are to be tested, the fluid-displacing units are moved outwardly so that the ball elements 33 thereof engage with the outer ends of the lever 21, thus providing for greater linear travel of the pistons 29 and increased fluid displacement from the wells 28, so that the forces produced in oscillating the lever will be indicated on the high pressure scale 41 of the gage.

While I prefer to employ the dual fluid-displacing units with the lever common to both thereof for the reason that the torque-receiving element or shaft 17 may be rotated in either direction for the convenience of the testing operator, nevertheless, it will be understood that in a more simplified form of the instrument, a single fluid-displacing unit may be used, in which case the lever 21 may be in the form of a crank arm. In such a simple form of the invention, however, the shaft 17 must be rotated in but one direction when the devices undergoing torque measurement are applied thereto and rocked to cause actuation of the pressure gage. A similar single fluid-displacing unit has been disclosed in my prior application, Serial No. 517,849, filed January 11, 1944, now Patent No. 2,411,931, with regard to which the present application constitutes a continuation-in-part.

I claim:

Torque-testing apparatus comprising a base, spaced bearings arising from said base, a shaft supported by said bearings for rocking movement, one end of said shaft being formed to receive a device undergoing torque testing, a lever mounted on said shaft between said bearings for rocking movement in unison with the shaft, said lever projecting equidistantly on both sides of said shaft, a pair of fluid-receiving cylinders mounted on said base beneath said lever, each of said cylinders being provided with a slidable piston having its upper end in direct antifriction engagement with said lever, each of said cylinders being provided with fluid-containing chambers beneath the piston therein, a pressure gauge, fluid-transmitting conduits extending from the chambers of said cylinders to said pressure gauge, the lower portions of said cylinders being formed with horizontally extending threaded bores, and a manually rotatable screw shaft supported by said base and extending through said bores for engagement with the threads therein, whereby through the rotation of said shaft, said cylinders are moved bodily and uniformly toward and away from the center of oscillation of said lever.

GERALD E. McVEY.

REFERENCES CITED

The following references are of record in the file of this patent:

UNITED STATES PATENTS

| Number | Name | Date |
|---|---|---|
| 741,248 | Jones | Oct. 13, 1903 |
| 1,642,095 | Tracy | Sept. 13, 1927 |
| 2,190,967 | Zimmerman | Feb. 20, 1940 |
| 2,217,642 | Luhrs | Oct. 8, 1940 |
| 2,279,912 | Bohannan | Apr. 14, 1942 |
| 2,313,655 | Marshall | Mar. 9, 1943 |